United States Patent [19]

Winthrop

[11] Patent Number: 4,514,061
[45] Date of Patent: Apr. 30, 1985

[54] PROGRESSIVE POWER OPHTHALMIC LENSES

[75] Inventor: John T. Winthrop, Wellesley, Mass.

[73] Assignee: American Optical Corporation, Southbridge, Mass.

[21] Appl. No.: 543,223

[22] Filed: Oct. 20, 1983

Related U.S. Application Data

[63] Continuation of Ser. No. 246,139, Apr. 2, 1981, abandoned, which is a continuation-in-part of Ser. No. 232,755, Feb. 9, 1981, abandoned.

[51] Int. Cl.³ .............................................. G02C 7/06
[52] U.S. Cl. .................................................... 351/169
[58] Field of Search ................................ 351/168–172

[56] References Cited

U.S. PATENT DOCUMENTS

| | | | |
|---|---|---|---|
| 1,448,052 | 3/1923 | Brilhart | 351/169 |
| 3,785,724 | 1/1974 | Cretin-Maitenaz | 351/169 |
| 4,274,717 | 6/1981 | Davenport | 351/169 |
| 4,315,673 | 2/1982 | Guilino et al. | 351/169 |

Primary Examiner—John K. Corbin
Assistant Examiner—Scott J. Sugarman
Attorney, Agent, or Firm—Brumbaugh, Graves, Donohue & Raymond

[57] ABSTRACT

An ophthalmic lens for the correction of presbyopia having a progressive power surface generated by the line of intersection of an ordered sequence of intersecting spheres and cylinder surfaces, the cylinder surfaces being so chosen as to produce a uniform distribution of aberration and optical power for gently curving smooth optical effect.

10 Claims, 15 Drawing Figures

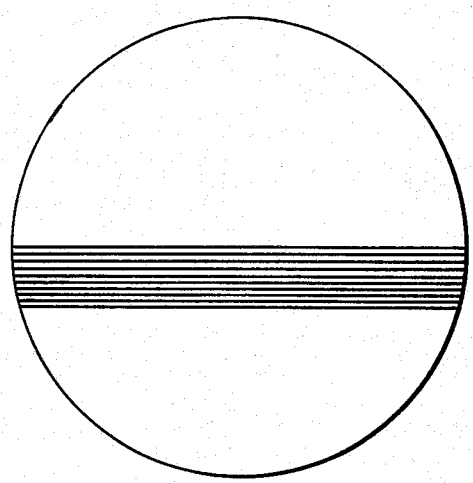
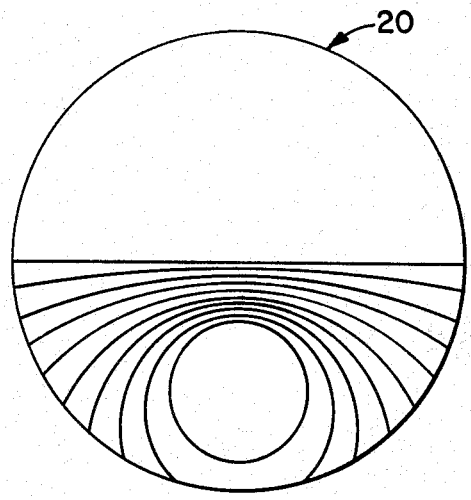
FIG. 6A
(PRIOR ART)
FIG. 6B

Y (MM)

| | 0 | 4 | 8 | 12 | 16 | 20 | 24 | 28 | 32 | 36 |
|---|---|---|---|---|---|---|---|---|---|---|
| X = -36.00 MM | 7.0673 | 7.1696 | 7.4773 | | | | | | | |
| X = -32.00 MM | 5.4483 | 5.5485 | 5.8499 | 6.3549 | 7.0673 | | | | | |
| X = -28.00 MM | 4.0581 | 4.1566 | 4.4529 | 4.9490 | 5.6489 | 6.5578 | 7.6881 | | | |
| X = -24.00 MM | 2.8852 | 2.9828 | 3.2743 | 3.7633 | 4.4529 | 5.3482 | 6.4563 | 7.7862 | | |
| X = -20.00 MM | 1.9204 | 2.0166 | 2.3050 | 2.7882 | 3.4696 | 4.3540 | 5.4483 | 6.7612 | | |
| X = -16.00 MM | 1.1565 | 1.2516 | 1.5375 | 2.0163 | 2.6913 | 3.5674 | 4.6510 | 5.9507 | 7.4773 | |
| X = -12.00 MM | 0.5881 | 0.6825 | 0.9666 | 1.4421 | 2.1124 | 2.9823 | 4.0581 | 5.3482 | 6.8631 | |
| X = -8.00 MM | 0.2112 | 0.3053 | 0.5881 | 1.0615 | 1.7287 | 2.5946 | 3.6653 | 4.9490 | 6.4563 | 8.2064 |
| X = -4.00 MM | 0.0234 | 0.1173 | 0.3994 | 0.8718 | 1.5375 | 2.4016 | 3.4757 | 4.7729 | 6.3059 | 8.0894 |
| X = 0.00 MM | 0.0235 | 0.1198 | 0.4095 | 0.8956 | 1.5826 | 2.4761 | 3.5834 | 4.9136 | 6.4785 | 8.2927 |
| X = 4.00 MM | 0.2188 | 0.3302 | 0.6592 | 1.1954 | 1.9318 | 2.8692 | 4.0142 | 5.3775 | 6.9729 | 8.8170 |
| X = 8.00 MM | 0.6402 | 0.7706 | 1.1506 | 1.7544 | 2.5585 | 3.5543 | 4.7468 | 6.1494 | 7.7794 | 9.6570 |
| X = 12.00 MM | 1.3282 | 1.4700 | 1.8888 | 2.5576 | 3.4376 | 4.5050 | 5.7585 | 7.2121 | 8.8869 | |
| X = 16.00 MM | 2.3115 | 2.4569 | 2.8947 | 3.6140 | 4.5676 | 5.7135 | 7.0398 | 8.5579 | 10.2911 | |
| X = 20.00 MM | 3.6091 | 3.7580 | 4.2071 | 4.9596 | 5.9758 | 7.1978 | 8.6019 | 10.1949 | | |
| X = 24.00 MM | 5.2444 | 5.3980 | 5.8615 | 6.6412 | 7.7064 | 8.9945 | 10.4746 | 12.1484 | | |
| X = 28.00 MM | 7.2507 | 7.4105 | 7.8928 | 8.7028 | 9.8070 | 11.1497 | 12.7005 | | | |
| X = 32.00 MM | 9.6747 | 9.8425 | 10.3491 | 11.1883 | 12.3239 | | | | | |
| X = 36.00 MM | 12.5822 | 12.7588 | 13.2851 | | | | | | | |

FIG. 9

PROGRESSIVE POWER OPHTHALMIC LENSES

CROSS REFERENCE TO RELATED APPLICATIONS

This application is a continuation of application Ser. No. 246,139, filed Apr. 2, 1981, now abandoned, which is a continuation-in-part of application Ser. No. 232,755, filed Feb. 9, 1981, now abandoned.

BACKGROUND OF THE INVENTION

1. Field of the Invention

This invention relates to ophthalmic lenses in general and is more particularly concerned with improvements in progressive power lenses for the correction of presbyopia.

2. Description of the Prior Art

The use of progressive power lenses for the correction of presbyopia has become increasingly popular in recent years. In addition to their obvious cosmetic appeal, progressive lenses provide significant functional benefits to the patient, namely a continuous range of focal powers and an unobstructed visual field. Such advantages are, however, partially offset by peripheral astigmatism and distortion aberrations that are unavoidably present in all progressive lenses. The design of progressive lenses thus naturally centers on reducing the unwanted aberrations to minimum effect.

It is generally recognized that the aberrations can be minimized permitting them to extend over broad areas of the lens including, for example, the peripheral portions of the near vision level. This, of course, implies a sacrifice of acuity in those peripheral areas. However, virtually all modern commercial progressive lenses make use of the principle of extended-area aberration control. U.S. Pat. Nos. 3,687,528 and 4,056,311 are exemplary.

It is not enough merely to state that the aberrations shall occupy extended areas of the lens. The manner of their distribution within those areas is critically important. Badly distributed aberrations can undo the potential advantage gained by sacrificing acuity within the peripheral areas. For example, if a high value is placed on the requirement of orthoscopy (i.e. the maintence of horizontals and verticals in visual field), the designer shapes the peripheral aberrated zones in such a way that the component of vertical prism along horizontal lines remains constant. The corrected peripheral areas, however, must be joined to the central portion of the intermediate area, and the latter cannot be corrected to preserve orthoscopy. Therefore, a blend zone must be interposed between the inner and outer areas. The blend must not be made too abruptly or the visually annoying condensation of aberration within the blend zone will overpower and may effectively negate the advantage of orthoscopy gained at the lens periphery.

Progressive lenses heretofore designed for preservation of orthoscopy do not directly address the requirement of uniform distribution of aberrations and it is a principal object of this invention to fully exploit a technique of extended-area aberration control to achieve a smooth and natural optical effect.

More particularly, there is the objective of providing a progressive power ophthalmic lens with progressive surface designed to insure a uniform distribution of aberrations and a smooth optical effect with orthoscopy at least approximately preserved in lateral peripheral areas of the lens and without accrual of strong aberrations elsewhere in the lens.

Still another object is to provide a natural flow of optical lens power which will be readily accepted by emerging and advanced presbyopes alike.

SUMMARY OF THE INVENTION

The only known method for reducing the strength of progressive power lens aberrations is to allow a spread over a larger than usual area which entails redefinition of boundaries of the spherical distance portion (DP) and reading portion (RP) zones.

With many variations possible, including circular and parabolic RP's beneath a straight or upwardly concave arc defining the DP boundary, a progressive intermediate portion (IP) is generated by the line of intersection of an ordered sequence of intersecting spheres and cylinder surfaces with cylinder chosen to produce a gently curving surface insuring smooth optical effect.

Details of the invention will become apparent from the following description when taken in conjunction with accompanying drawings:

IN THE DRAWINGS

Figure 7:
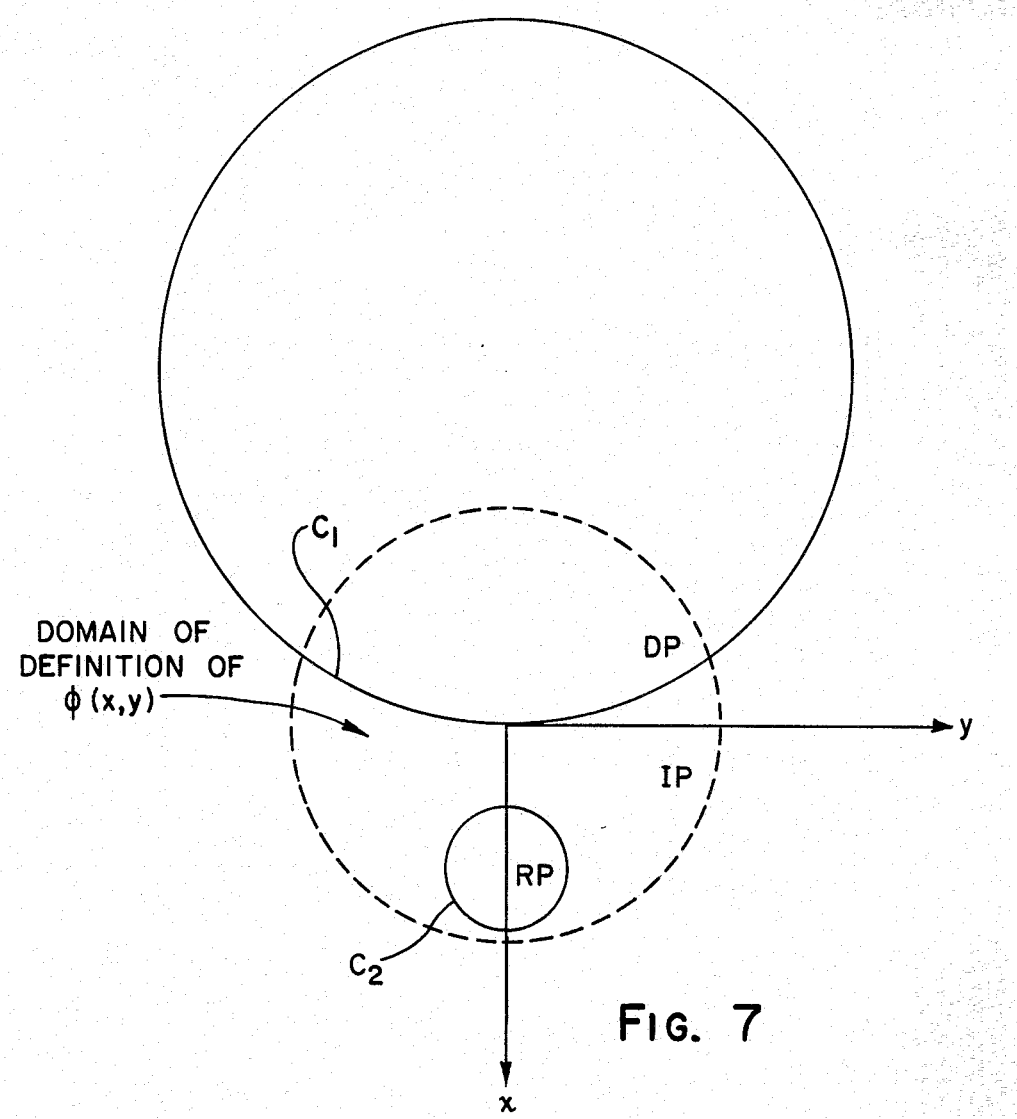
Figure 8:
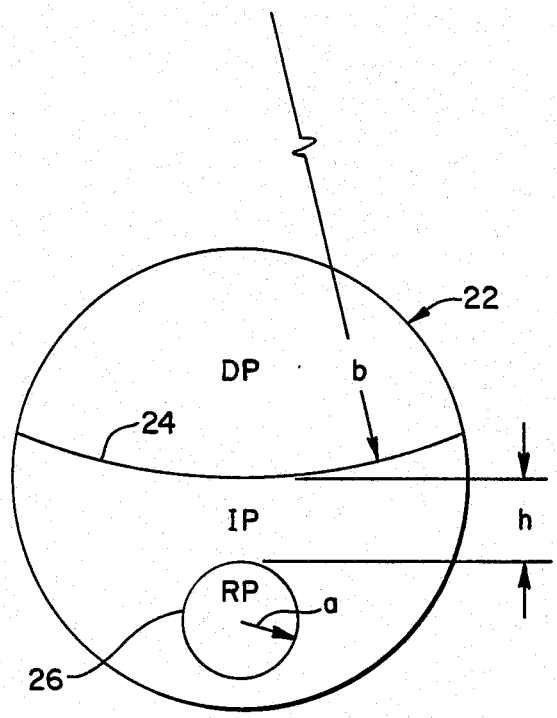
Figure 10:
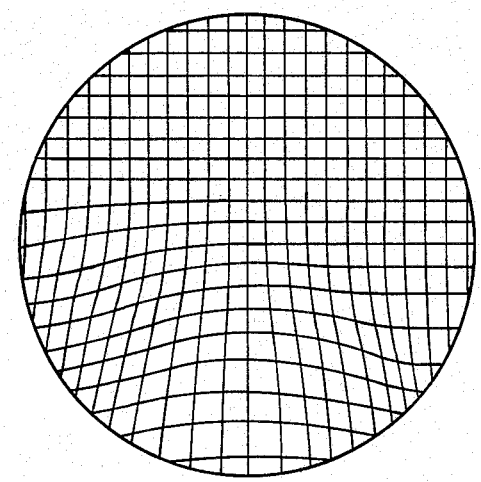

FIGS. 5A, 5B, 5C and 5D diagrammatically illustrate some of various definitions of DP and RP boundaries possible to achieve a reduction of strength of aberrations according to the invention;

FIGS. 6A and 6B demonstrate a geometrical transformation from a prior art IP of lens progressive power to one representative of the present invention;

FIG. 7 schematically illustrates a development of cylindrical surfaces chosen to satisfy aims of the present invention;

FIG. 8 depicts viewing zones of a lens constructed according to principles of the invention;

FIG. 9 is an electronic computer evaluation of one half of a symmetrical lens of the general design depicted in FIG. 8; and FIG. 10 illustrates a grid pattern produced by a lens of the FIGS. 7-9 design.

DESCRIPTION OF THE PREFERRED EMBODIMENTS

Lenses under consideration by the present invention are assumed to be made of glass or a plastic material having a uniform refractive index. The changing curvatures required for progressive power are confined to the convex side of the lens with the concave side being reserved for prescription grinding in the usual way. The convex side of the lens will hereafter be referred to as a "progressive surface". However, there is no intention to limit the invention to lenses having convex progressive surfaces since the present principles apply equally well to convex or concave progressive surfaces.

The lens design which comprises the present invention is considered an improvement over earlier design and exposition of the present design begins with reference to the prior art where Canadian Pat. No. 583,087 is exemplary.

Figure 1A:
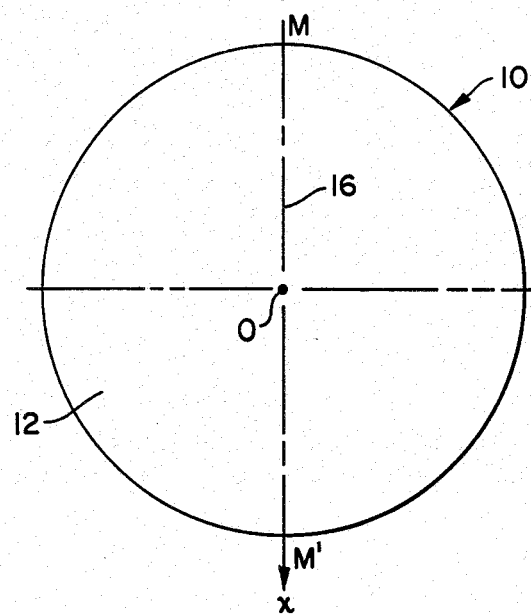
FIGS. 1A and 1B illustrate, in vertical elevation and cross-section respectively, a progressive power ophthalmic lens of a type dealt with according to the present invention.
Figure 1B:
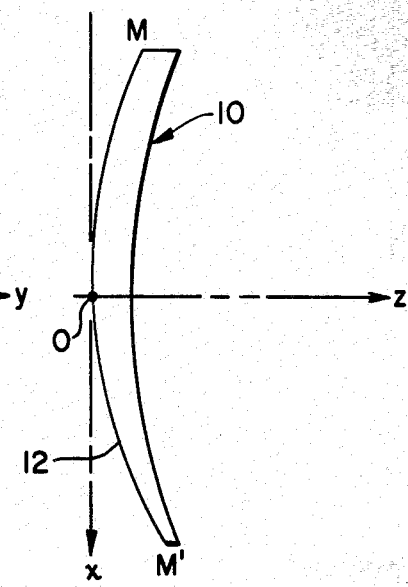
Figure 2:
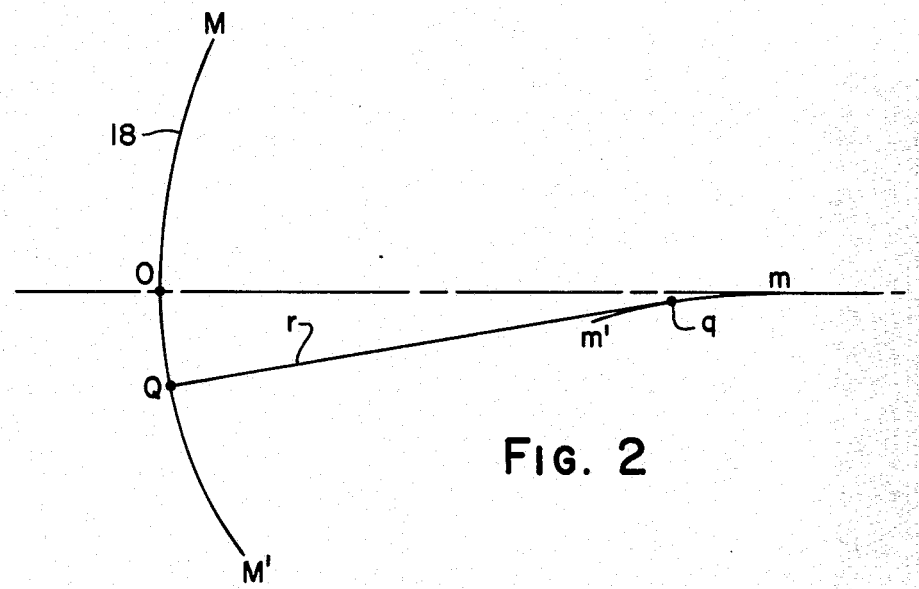
FIG. 2 illustrates the evolute of the meridional line of the lens of FIGS. 1A, 1B.

Prior art lens 10 (FIGS. 1A and 1B) can be described as follows:

With progressive surface 12 tangent to a vertical plane 14 at the geometrical center O, a second vertical plane 16 passes through O at right angles to the first vertical plane and divides the lens into two symmetrical halves. The second plane 16 is called the principal vertical meridian and its curve of intersection MM' with the progressive surface is called the meridian line 18, FIG. 2.

Functional requirements of a progressive lens dictate that the surface along the meridian line and its partial derivatives, at least through second order and preferably through third order, be continuous. To provide for progressive power variation, the curvature of the meridian line increases continuously in a predetermined manner from a minimum value in the upper half of the lens to a maximum value in the lower half.

The locus of the centers of curvature of the meridian line 18 comprises a continuous plane curve mm' (FIG. 2) called the evolute of the meridian line. For each point Q of the meridian line there exists a corresponding point q on the evolute. The radius vector qQ connecting two corresponding points (Q,q) is perpendicular to the meridian line 18 at Q and tangent to the evolute mm' at q.

Figure 3:
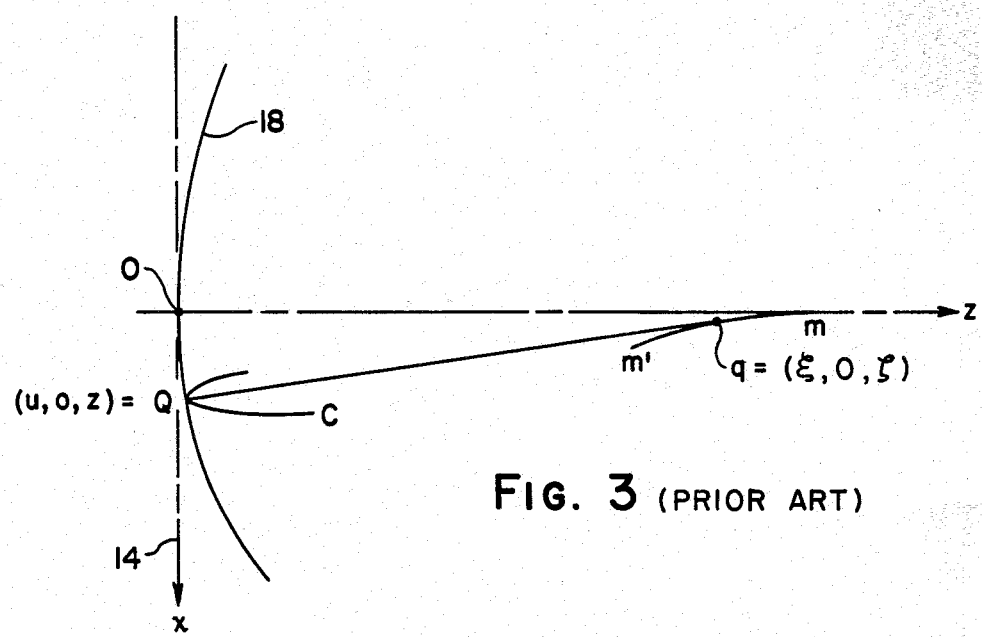
FIG. 3 is a schematic illustration of construction of a progressive surface of the lens of FIGS. 1A, 1B.

FIG. 3 illustrates the construction of the pertinent embodiment of the design. The progressive surface is generated by a circular arc C of horizontal orientation and variable radius which passes successively through all points Q of the meridian line 18. Specifically, the generator C through a given point Q is defined as the line of intersection between a sphere of radius Qq centered at q and a horizontal plane through Q. Thus, the complete progressive surface may be considered to be generated by the line of intersection of an ordered sequence of intersecting spheres and horizontal planes. As a consequence of this construction, the principal curvatures at each point of the meridian line are equal, i.e. the surface is free of astigmatism at the meridian line.

The progressive surface 12 of this prior art lens is readily described in algebraic terms. A rectangular coordinate system (FIG. 1) is defined whose origin coincides with O, and whose x-y plane coincides with the tangent plane at O. The x-axis points downward in the direction of increasing optical power.

Letting u denote the x-coordinate of a point Q on the meridian line, the coordinates $(\xi, \eta, \zeta)$ of the corresponding point q on the evolute, as well as the radius of curvature $r = qQ$, may be expressed as a function of the parameter u:

$$\xi = \xi(u)$$
$$\eta = 0$$
$$\zeta = \zeta(u) \quad (1)$$
$$r = r(u) \quad (2)$$

The equation of the sphere of radius r(u) centered at q, expressed as an elevation with respect to the x-y plane, may be written $$z = \zeta(u) - \{r^2(u) - [x - \xi(u)]^2 - y^2\}^{\frac{1}{2}} \quad (3)$$

The equation of a horizontal plane through Q is $$x = u \quad (4)$$

Equation (3) represents a family of spheres, and Equation (4) a family of parallel planes. The members of each family are generated by the single parameter u. For each value of u there exists a unique sphere and a plane that intersects it. By eliminating u between Equation (3) and Equation (4), a generated arc C (FIG. 3) is created through each point Q of the meridian line, thus producing the required equation of the progressive surface $z = f(x,y)$, where $$f(x,y) = \zeta(x) - \{r^2(x) - [x - \xi(x)]^2 - y^2\}^{\frac{1}{2}} \quad (5)$$

Figure 4:
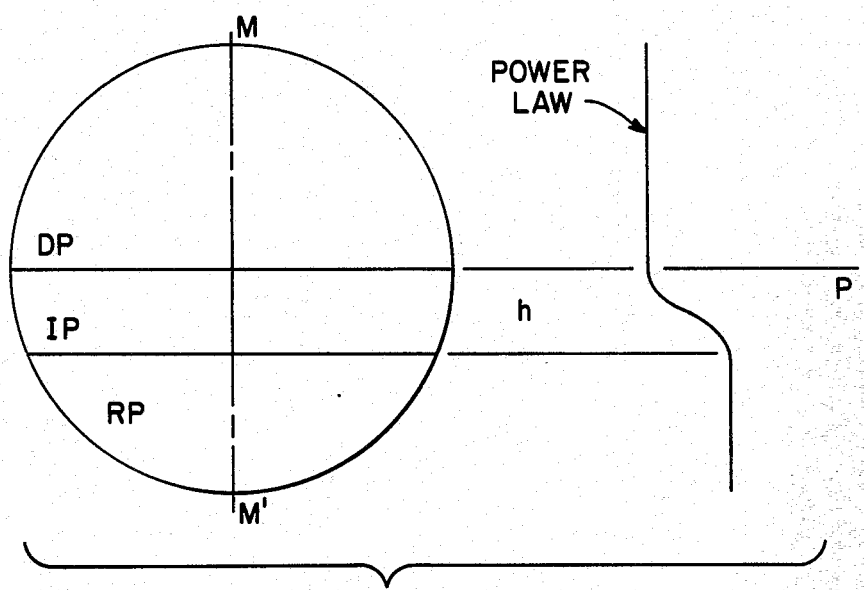
FIG. 4 is a vertical elevational view of a prior art progressive power ophthalmic lens showing various viewing zones thereof and the associated power law.

If the meridional power law of lens 10 has the conventional form illustrated in FIG. 4, then the DP and RP areas of the design are spherical and extend over the full width of the lens. Such a design provides full distance and reading utility, but, as is well known, aberrations within the IP area are unacceptably strong.

Figure 5A:
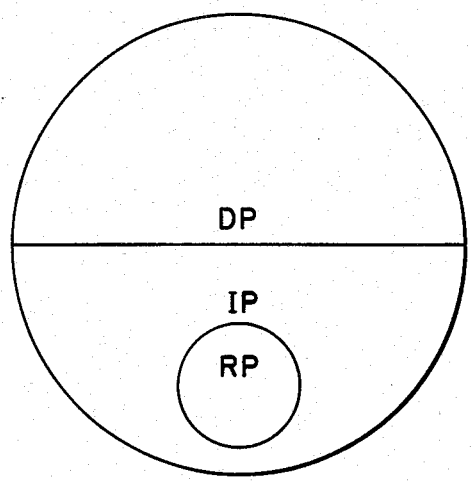
Figure 5B:
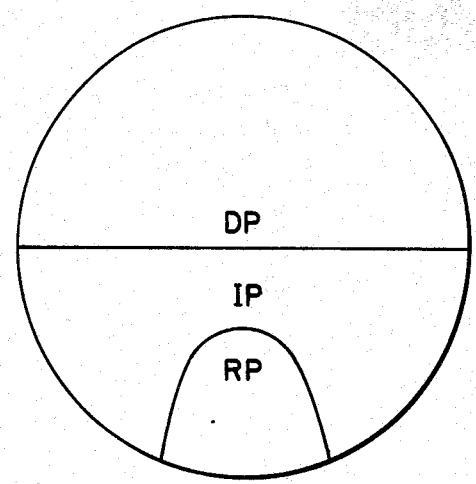
Figure 5C:
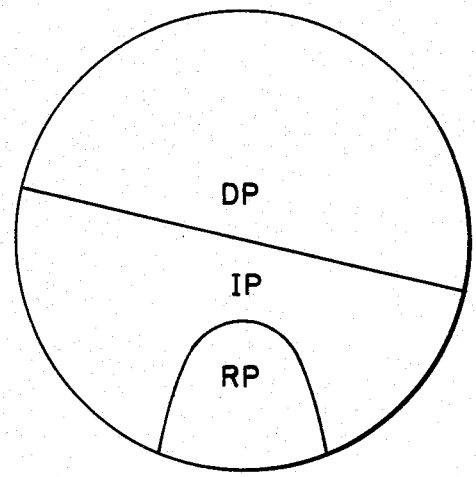
Figure 5D:
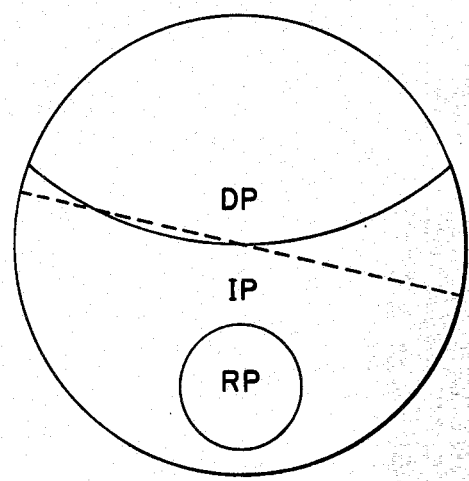

According to the present invention, and as mentioned heretofore, the only known method for actually reducing the strength of the aberrations is to allow them to spread over a larger area of the lens. This entails a redefinition of the boundaries of the spherical DP and RP zones with many variations possible, some of which are illustrated in FIGS. 5A, 5B, 5C, and 5D. In the lens of FIG. 5A, the spherical DP occupies the upper half of the lens (e.g. as in Canadian Pat. No. 583,087) but the spherical RP is bounded by a circle. The example of FIG. 5B is similar to FIG. 5A, except that the RP boundary is parabolic. In the asymmetrical example of FIG. 5C, the RP boundary is parabolic and the DP boundary is inclined 9° from the horizontal. This boundary becomes horizontal after rotating the lens 9° to provide the traditional inset of the RP. The example of FIG. 5D differs from that of FIG. 5A in that the DP boundary is an upwardly concave circular arc which permits an additional spreading out of the aberrations. The radius of the DP arc must be long enough so that, after rotation of the lens 9°, the aberrations on the temporal side do not interfere with lateral eye movement in the distance gaze. In practice, this means that the DP arc should not be much less than about 65 milimeters in radius.

With DP and RP boundaries defined, it remains to determine the form of the IP that exists between them. This is accomplished by applying a geometrical transformation from the prior art, the nature of which is illustrated in FIGS. 6A and 6B. In FIGS. 6A a prior art lens has been illustrated showing the intersections of members of the family of planes $x = u$ with x-y plane. These intersections form a family of parallel straight lines, which are in turn parallel to the DP and RP boundaries. As FIG. 6B indicates, in passing to an embodiment of the present invention, the family of parallel straight lines transforms into a family of more or less equally-spaced curved lines. The curved lines of lens 20 (FIG. 6B) represent the intersections of a one-parameter family of cylinders with the x-y plane. For each member of the original family of planes, there exists a corresponding member of the family of cylinders. Corresponding members of the two families are identified by the same parameter u, where u is the x-coordinate of a point Q on either meridian line. The construction of the new progressive surface is generated by the line of intersection of an ordered sequence of intersecting spheres and cylindrical surfaces. In particular, the equation of any member of the family of cylindrical surfaces may be written in the form $$x = g(y, u). \quad (6)$$

This equation may be solved for the parameter u, giving an equation of the form $$u = h(x,y), \quad (7)$$

which reduces to Equation (4) in the case of the prior art lens. The equation of the progressive surface of the present lens is obtained by eliminating the parameter u between Equations (7) and (3). Explicitly, $$f(x,y) = \zeta[h(x,y)] - (\{r[h(x,y)]\}^2 - \{x - \xi[h(x,y)]\}^2 - y^2)^{\frac{1}{2}} \quad (8)$$

The detailed form of the resulting progressive surface will naturally depend on the form and spacing of the cylindrical surfaces, Equation (6). To satisfy aims of the invention, the cylindrical surfaces must be chosen so as to produce a gently curving surface ensuring a smooth optical effect.

The form of the cylindrical surfaces is determined as follows:

Considering a certain auxiliary function $\phi(x,y)$, defined on the x-y plane in the space exterior to the curves representing the DP and RP boundaries, which have been mathematically continued to form closed curves as indicated in FIG. 7, $\phi$ takes on the constant boundary values $c_1$ and $c_2$ respectively at the DP and RP boundaries. The smoothest function $\phi(x,y)$ consistent with the given geometry and boundary values is determined as follows:

If the problem were one-dimensional, rather than two-dimensional, it would be obvious that if $\phi(x)$ has the boundary values $\phi(0) = c_1$, $\phi(1) = c_2$, then the smoothest function $\phi(x)$ between $x=0$ and $x=1$ is the linear function $\phi(x) = c_1 + (c_2 - c_1)x$. This function satisfies the differential equation $$\frac{d^2\phi}{dx^2} = 0 \quad (9)$$

Thus, the required function $\phi(x,y)$ in the two-dimensional case satisfies the two-dimensional Laplace equation:

$$\frac{\partial^2 \phi}{\partial x^2} + \frac{\partial^2 \phi}{\partial y^2} = 0 \quad (10)$$

Functions satisfying Equation (10) are called harmonic functions. This result may be deduced in another way. A criterion for the requirement of smoothness is to require that the average values of the moduli of the derivatives $\delta\phi/\delta x$ and $\delta\phi/\delta y$ be a minimum. Alternatively, if the average of the sum of the squares of these quantities is considered, i.e., the integral $$\int\int \left[ \left(\frac{\partial \phi}{\partial x}\right)^2 + \left(\frac{\partial \phi}{\partial y}\right)^2 \right] dxdy \quad (11)$$

then, on application of the Euler-Lagrange principle, Equation 11 is minimized when $\phi(x,y)$ satisfies Laplace's equation (Equation 10). Thus Laplace's equation defines the smoothest function between the DP and RP boundaries.

To make use of the auxiliary function $\phi$, we form the level curves $$\phi(x,y) = c \quad (12)$$

which are defined as curves along which $\phi$ has a constant value. These curves may be expressed in the form given by Equation (6) or Equation (7), and may therefore be taken to represent the required family of cylinders.

To summarize, the progressive surface of the invention is generated by a generating curve C, which is the line of intersection between an ordered sequence of spheres of radii qQ centered on the evolute of the meridian line, and a corresponding sequence of cylinders whose generating line runs parallel with the z-axis, and whose intersections with the x-y plane coincide with the level surfaces of the harmonic function $\phi$ which attains constant values at the DP and RP boundaries.

Because the level curves are derived from harmonic functions, the incorporation of level curves into the definition of the progressive surface ensures a uniform distribution of aberration and optical power.

The theory of harmonic functions provides two well known methods for determining the level curves. The first requires finding an orthogonal system of curvilinear coordinates with coordinate curves that coincide with the DP and RP boundaries. The coordinate curves between the DP and RP boundaries may then be identified with the level curves of the system. The second method, conformal mapping, executes a transformation of the level curves of the simpler prior art system into the level curves of the more complex lens comprising the invention. Use of these methods allows construction of a progressive surface with DP and RP boundaries of arbitrary shape.

NUMERICAL EXAMPLE

An example of a lens constructed according to the above principles is as follows:

As depicted in FIG. 8, the spherical DP of lens 22 is bounded by a circular arc 24 and the spherical RP is bounded by a circle 26. The progressive corridor begins at the origin O. The DP and RP boundaries may be regarded as coordinate lines in a bipolar system of coordinates. The level curves between the DP and RP boundaries can therefore be identified with the coordinate lines of the bipolar system.

For generality, define
a = radius of RP boundary
b = radius of DP boundary
h = length of progressive corridor The level curve through an arbitrary point x,y intersects the x-axis at the point u(x,y). After calculation, it is found that $$u(x,y) = \delta + sgn(x - \delta)\left( \frac{(x - \delta)^2 + w^2 + y^2}{2|x - \delta|} - \right. \quad (13)$$

$$\left\{\left[\frac{(x-\delta)^2+w^2+y^2}{2(x-\delta)}\right]^2-w^2\right\}^{\frac{1}{2}}\right)$$

where $$w^2=(h-\delta)^2+2a(h-\delta) \qquad (14)$$

$$\delta = \frac{h^2+2ah}{2(a+b+h)} \qquad (15)$$

Equation (13) represents a special case of Equation (7).

Defining,
$r_D$ = radius of curvature of DP sphere
$r_R$ = radius of curvature of RP sphere
The equation of the progressive surface may be written:

Distance Portion:

$$f(x,y)=r_D-(r_D^2-x^2-y^2)^{\frac{1}{2}} \qquad (16)$$

Progressive Zone (from Equation (3)):

$$f(x,y)=\zeta(u)-\{r^2(u)-[x-u+r(u)\sin\theta(u)]^2-y^2\}^{\frac{1}{2}} \qquad (17)$$

where $$\sin\theta(u) \equiv \frac{u-\xi(u)}{r(u)} \qquad (18)$$

$$= \int_0^u \frac{du}{r(u)} \qquad (19)$$

$$\xi(u) = r(u)\cos\theta(u) + \int_0^u \tan\theta(u)\,du \qquad (20)$$

$$\frac{1}{r(u)} = \frac{1}{r_D} + \left(\frac{1}{r_R}-\frac{1}{r_D}\right)(c_2u^2+c_3u^3+c_4u^4+c_5u^5) \qquad (21)$$

$c_2 = 10/3h^2$
$c_3 = 0$
$c_4 = -5/h^4$
$c_5 = 8/3h^5$ $u(x,y)$ is given by Equation (13);

Reading Portion:

$$f(x,y)=\zeta(h)-\{r_R^2-[x-h+r_R\sin\theta(h)]^2-y^2\}^{\frac{1}{2}} \qquad (22)$$

For simplicity, the above equations have been presented for the case in which the beginning of the progressive corridor coincides with the center, O, of the lens blank. It may be desirable, however, to decenter the entire progressive surface up or down, right or left, relative to the geometrical center O. The equation of the decentered surface relative to the original system of coordinates is obtained by replacing x and y in the above equations by $x-d_1$ and $y-d_2$, respectively, where $d_1$ and $d_2$ are the x and y values of decentration.

The progressive surface generally defined by Equations (13)–(22) will now be evaluated for a lens having a reading addition of 3.00 diopters. The lens is assumed to have an index of refraction of 1.523, and the following values of the parameters are assumed a = 10.00 mm
b = 91.0 mm
h = 16.0 mm
$r_D$ = 84.319 mm
$r_R$ = 57.285 mm
$d_1$ = 2.00 mm
$d_2$ = 0.00 mm FIG. 9 shows the results of an electronic computer evaluation of the equations, using the given values of the parameters. Because the lens is symmetrical about the vertical meridian, only the right half is shown. This figure gives the elevation of the surface above the x-y plane, computed at 4 mm intervals. Because the x-y plane is tangent to the lens surface at the point $x=-2$, $y=0$, the elevation at $x=y=0$ is non-zero.

When a square grid is viewed through a progressive lens of the invention the distorted pattern of the grid provides information about the distribution and strength of the lens aberrations. The grid pattern produced by the lens described above is depicted in FIG. 10. In this diagram, the lens was rotated 9°, as it would be when mounted in a spectacles frame. It will be seen that the grid lines are continuous, smoothly flowing, and uniformly distributed. Note also that the grid lines in the periphery of the temporal side are oriented horizontally and vertically; this means that orthoscopy is preserved in that area. While orthoscopy may not be as well preserved in the nasal periphery of the progressive zone, this is not objectionable because much of the nasal side is removed by edging for spectacles frame glazing.

It is to be understood that the term "lens" as used herein is intended to include the ophthalmic product in any and all forms common to the art, i.e. including lens blanks requiring second side (concave or convex) finishing as well as lenses finished on both sides and "uncut" or "cut" (edged) to a size and shape required for spectacles frame glazing. The present lenses may be formed of glass or any one of the various known and used ophthalmic plastics. If second side finished, i.e. on the side opposite that having the progressive power surface, the second side may have prescription surface curvatures applied with the lens RP decentered in usual fashion.

Those skilled in the art will readily appreciate that there are various forms and adaptations of the invention not discussed herein which may be made to suit particular requirements. Accordingly, the foregoing illustrations are not to be interpreted as restrictive beyond that necessitated by the following claims.

I claim:

1. In a progressive power ophthalmic lens having two refractive surfaces one of which is divided into three viewing zones comprising an upper distance portion, an intermediate progressive portion and a lower near portion, and having a principal vertical meridian defined by a sequence of points traversing said zones, wherein said distance portion occupies approximately the upper half of said lens and is of substantially spherical configuration providing a substantially constant focal length for distant vision, wherein said near portion occupies a lower portion of said lens and is of substantially spherical configuration providing a substantially constant focal length for near vision, and wherein said intermediate progressive portion lies between and has defined boundaries with said distance and near portions and has a varying curvature which increases continuously and progressively along said meridian from a minimum value, which approximates the curvature of said distance portion, to a maximum value, which approximates the curvature of said near portion, the improvement wherein said intermediate progressive portion is defined by a series of generating curves passing successively through all points of the meridian within said progressive portion, said generating curves being the lines of intersection of an ordered sequence of spheres and a corresponding ordered sequence of cylinders, said spheres being tangent to points on the meridian and having radii equal to the radius of curvature of the meridian at each point, and said cylinders having generating lines parallel to a line normal to the center point of said lens, the generating curves being so constructed and arranged that aberrations are distributed uniformly around said near portion with at least approximate preservation of orthoscopy.

2. A lens according to claim 1 wherein said generating curves coincide with the level surfaces of a harmonic function which attains constant values at the boundaries of said progressive portion with said near and distance portions.

3. A lens according to claim 1 wherein the boundary between said distance portion and said intermediate progressive portion is substantially straight and horizontally disposed.

4. A lens according to claim 1 wherein the boundary between said distance portion and said intermediate progressive portion is at least partially upwardly concave.

5. A lens according to claim 1 wherein the upwardly concave boundary is approximately symmetrical with respect to the principal meridian.

6. A lens according to claim 1 wherein the boundary between said near portion and said intermediate progressive portion is approximately circular.

7. A lens according to claim 1 wherein the boundary between said near portion and said intermediate progressive portion is approximately of parabolic configuration.

8. A ophthalmic lens according to claim 1 wherein said progressive portion is generated according to the equations:

$$f(x,y) = \zeta(u) - \{r^2(u) - [x - u + r(u)\sin\theta(u)]^2 - y^2\}^{\frac{1}{2}}$$

where $$\sin\theta(u) = \frac{u - \xi(u)}{r(u)}$$

-continued $$= \int_0^u \frac{du}{r(u)}$$

$$\xi(u) = r(u)\cos\theta(u) + \int_0^u \tan\theta(u)\, du$$

$$\frac{1}{r(u)} = \frac{1}{r_D} + \left(\frac{1}{r_R} - \frac{1}{r_D}\right)(c_2 u^2 + c_3 u^3 + c_4 u^4 + c_5 u^5)$$

$$u(x,y) = \delta + \text{sgn}(x - \delta)\left(\frac{(x-\delta)^2 + w^2 + y^2}{2|x-\delta|} - \left\{\left[\frac{(x-\delta)^2 + w^2 + y^2}{2(x-\delta)}\right]^2 - w^2\right\}^{\frac{1}{2}}\right)$$

where
u = the x coordinate of a point on the meridian;
$r_D$ = radius of curvature of the distance portion;
$r_R$ = radius of curvature of the near portion;
$C_2 = 10/3h^2$
$C_3 = 0$
$C_4 = -5/h^4$
$C_5 = 8/3h^5$
$w^2 = (h = \delta)^2 + 2a(h - \delta)$ $$\delta = \frac{h^2 + 2ah}{2(a + b + h)}$$

h = length of the progressive corridor;
a = the radius of curvature of the boundary of the near portion with the progressive portion and;
b = the radius of curvature of the boundary of the distance portion with the progressive portion.

9. An ophthalmic lens according to claim 8 wherein said near portion is defined by the equation:

$$f(x,y) = (h) - \{r_R^2 - [x - h + r_R \sin\theta(h)]^2 - Y^2\}^{\frac{1}{2}}$$

where
$r_R$ = radius of curvature of the near portion and
h = length of the progressive corridor.

10. An ophthalmic lens according to claim 9 wherein said distance portion is defined by the equation:

$$f(x,y) = r_D - (r_D^2 - x^2 - y^2)^{\frac{1}{2}}$$

where
$r_D$ = radius of curvature of the distance portion.

* * * * *

UNITED STATES PATENT AND TRADEMARK OFFICE
CERTIFICATE OF CORRECTION

PATENT NO. : 4,514,061
DATED : April 30, 1985
INVENTOR(S) : John T. Winthrop

It is certified that error appears in the above-identified patent and that said Letters Patent is hereby corrected as shown below:

Col. 4, line 53: after "with" insert --the--;

Col. 5, line 58: "$\delta\phi/\delta x$ and $\delta\phi/\delta y$" should read -- $\partial\phi/\partial x$ and $\partial\phi/\partial y$ --;

Col. 5, lines 61-65: before equation (11) insert: -- $\int$ --;

Col. 9 line 33: "claim 1" should read --claim 4--.

Signed and Sealed this

Eleventh Day of March 1986

[SEAL]

Attest:

DONALD J. QUIGG

Attesting Officer  Commissioner of Patents and Trademarks